United States Patent
Tan et al.

(10) Patent No.: US 10,287,992 B2
(45) Date of Patent: May 14, 2019

(54) GAS TURBINE ENGINE HYBRID VARIABLE BLEED VALVE

(71) Applicant: General Electric Company, Schenectady, NY (US)

(72) Inventors: Chiong Siew Tan, Niskayuna, NY (US); Hsiung-Wei Yeong, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 807 days.

(21) Appl. No.: 14/835,948

(22) Filed: Aug. 26, 2015

(65) Prior Publication Data

US 2017/0058783 A1   Mar. 2, 2017

(51) Int. Cl.
F02C 9/18 (2006.01)
F01D 25/32 (2006.01)
F01D 25/16 (2006.01)

(52) U.S. Cl.
CPC .............. *F02C 9/18* (2013.01); *F01D 25/162* (2013.01); *F01D 25/32* (2013.01); *F05D 2250/232* (2013.01); *F05D 2260/607* (2013.01); *Y02T 50/675* (2013.01)

(58) Field of Classification Search
CPC .......... F01D 25/162; F01D 25/32; F02C 9/18; F05D 2250/232; F05D 2260/607; Y02T 50/675; F02K 3/075
USPC ............................................ 415/145; 60/779
See application file for complete search history.

(56) References Cited

U.S. PATENT DOCUMENTS

| | | | |
|---|---|---|---|
| 3,638,428 | A | 2/1972 | Shipley et al. |
| 4,463,552 | A | 8/1984 | Monhardt et al. |
| 5,123,240 | A | 6/1992 | Frost et al. |
| 5,279,109 | A | 1/1994 | Liu et al. |
| 8,092,145 | B2 | 1/2012 | Martel et al. |
| 8,539,775 | B1 | 9/2013 | Wong |
| 2014/0109589 | A1 | 4/2014 | Pritchard, Jr. et al. |
| 2014/0245747 | A1 | 9/2014 | Pritchard, Jr. et al. |

FOREIGN PATENT DOCUMENTS

| | | |
|---|---|---|
| JP | 3260336 A | 11/1991 |
| JP | 2884803 B2 | 4/1999 |

OTHER PUBLICATIONS

Mark Lacagnina, "Icing a nearly undetectable weather hazard can knock out a jet engine.", Flight safety foundation, Jun. 2008.

*Primary Examiner* — Mark A Laurenzi
*Assistant Examiner* — Paul W Thiede
(74) *Attorney, Agent, or Firm* — Joseph J. Christian

(57) ABSTRACT

A hybrid variable bleed valve includes a static bleed slot disposed in a transition duct defining a flow path for a core air flow, a variable bleed valve door disposed radially outwardly of the transition duct and the static bleed slot, a radially inward bleed cavity defined radially outwardly of the transition duct and radially inward of the variable bleed valve door for collection of a plurality of particulates and a pressure recovery return duct in fluid communication with the radially inward bleed cavity and the transition duct. The hybrid variable bleed valve apparatus operable to open and close the variable bleed valve door to a booster bleed flow, flowing radially outwardly from the static bleed slot, for extraction of the particulates and provide a pressure recovery flow into the core air flow via the pressure recovery return duct. The hybrid variable bleed valve configured for use in a gas turbine engine.

20 Claims, 5 Drawing Sheets

GAS TURBINE ENGINE HYBRID VARIABLE BLEED VALVE

BACKGROUND

The disclosure relates generally to turbine engine variable bleed valves and, more particularly, to such valves used to prevent surge and remove of foreign matter from the primary or core flow path proximate the compressor inlet.

Gas turbine engines can suffer from combustion instability problems when large quantities of unwanted particulates, such as ice, ice crystals, water droplets, sand and dust, enter the core particularly when the engine is being operated at low power and low thrust operating conditions which are established when the engine is operated at idle.

To ensure optimum compressor performance and efficiency and alleviate the ingestion of such particulates into the core, it is well known in the gas turbine engine field to provide variable bleed valves (VBVs). Known VBVs are typically configured as outwardly (or inwardly) configured doors that open to provide a bleed flowpath to bleed off compressed air between the booster and core engine compressor of gas turbine engines. In doing so, unwanted particulates are drawn out of the core flowpath and into the bleed flowpath, and more particularly a bleed exhaust duct. The air is often bled from what is referred to as a gooseneck flowpath between the booster and core engine compressor. Aircraft fan jet gas turbine engines, and marine and industrial derivatives of such engines, have employed various forms of curved flowpaths and VBV bleed doors that are retracted into the flowpath casing so as to form an entrance to a bleed duct that bleeds booster or low pressure compressor discharge airflow and draw particulates out of the flowpath in a manner such as that disclosed in U.S. Pat. No. 4,463,552 entitled "Combined Surge Bleed and Dust Removal System for a Fan-Jet Engine" by Monhardt et al.

In one known configuration, opening and closing of the bleed duct is conventionally provided by a circumferentially disposed plurality of pivotal doors that open outwardly so as to retract into the engine structure or casing and are operated by a single unison ring powered by one or more fuel powered actuators. An example of such a system using a retracting pivotal door is disclosed in U.S. Pat. No. 3,638,428 entitled "Bypass Valve Mechanism" by Shipley et al. and assigned to the same assignee as the present invention and incorporated herein by reference. The operation of the VBV is scheduled by the engine controller, either a mechanical or digital electronic type may be used.

Problems associated with conventional bleed valve ducts and valve doors often occur in the form of pressure loss and exhaust gas temperature (EGT) upset. In particular, in current outward (and inward) VBV door designs, pressure loss is inevitable, especially when opening the VBV at cruise in order to extract ice crystals and shed ice from the booster vanes and blades. The airflow in current design is normally bled into a large cavity via one or more valve doors, prior to being discharged into a duct to the fan bypass hence incurring pressure loss. In addition, larger particulates and larger amounts of particulates such as ice require larger doors, resulting in larger pressure losses and larger actuator mechanisms to operate the larger doors. To avoid pressure losses, it is highly desirable to remove ice, ice crystal, water droplets sand and dust from the gooseneck, or core flowpath without removing core airflow or minimizing the amount of core airflow that is removed. It is additionally desirable to re-design the VBV within structural cavity constraints (bulkhead, actuator mechanism, exhaust duct and piping) while maintaining operability, capability and particulate extraction efficiency, as compared to state-of-the-art inward/outward door VBV design.

Thus, it is highly desirable to provide a bleed air valve, and an engine incorporating the bleed air valve, that includes the ability to remove unwanted particulates, such as ice, ice crystals, water droplets, sand and dust, from a compressor airflow and efficiently bleed air between the booster and a core engine compressor without incurring detrimental pressure losses or exhaust gas temperature upset.

BRIEF DESCRIPTION

These and other shortcomings of the prior art are addressed by the present disclosure, which includes a hybrid variable bleed valve apparatus and a gas engine including the hybrid variable bleed valve apparatus.

Briefly, one aspect of the present disclosure resides in a hybrid variable bleed valve apparatus. The hybrid variable bleed valve apparatus includes a static bleed slot, a variable bleed valve door, a radially inward bleed cavity and a pressure recovery return duct. The static bleed slot is disposed in a transition duct and extends generally axially downstream along an outer annular wall of the transition duct. The transition duct defines a flow path for a core air flow. The variable bleed valve door is disposed radially outwardly of the transition duct and the static bleed slot. The variable bleed valve door is operable about an axis at or near a radially inward end of the variable bleed valve door. The radially inward bleed cavity is defined radially outwardly of the transition duct and radially inward of the variable bleed valve door for collection of a plurality of particulates. The pressure recovery return duct includes an inlet in fluid communication with the radially inward bleed cavity and an outlet in fluid communication with the transition duct. The pressure recovery return duct is located downstream of the static bleed slot. The hybrid variable bleed valve apparatus is operable to open and close the variable bleed valve door to a booster bleed flow, flowing radially outwardly from the static bleed slot, for extraction of the plurality of particulates and provide a pressure recovery flow into the core air flow via the pressure recovery return duct.

Another aspect of the disclosure resides in a gas turbine engine hybrid variable bleed valve apparatus. The gas turbine hybrid variable bleed valve apparatus includes a transition duct, a static bleed slot disposed in the transition duct, a variable bleed valve door disposed radially outwardly of the transition duct and the static bleed slot, a radially inward bleed cavity defined radially outwardly of the transition duct and radially inward of the variable bleed valve door, a pressure recovery return duct and a booster bleed flowpath. The transition duct includes an annular outer wall defining a flow path for a core air flow. The static bleed slot extends axially from an upstream lip of the outer annular wall of the transition duct to a downstream lip of the outer annular wall of the transition duct and defines an opening in the outer annular wall as an inlet for a booster bleed flow. The variable bleed valve door is pivotable or rotatable about an axis at or near a radially inward end of the variable bleed valve door. The radially inward bleed cavity providing for collection of a plurality of particulates and defining therein a forward sub-cavity and an aft sub-cavity. The pressure recovery return duct includes an inlet in fluid communication with the cavity and an outlet in fluid communication with the transition duct and located downstream of the static bleed slot. The booster bleed flowpath extends from the static bleed slot, through the radially inward bleed cavity, to the variable bleed valve door and downstream or aft from the variable bleed valve door to a radial outer cavity, a bleed exhaust duct and a bypass. The hybrid variable bleed valve apparatus is operable to open and close the variable bleed valve door to a booster bleed flow, flowing radially outwardly from the static bleed slot, for extraction of the plurality of particulates and provide a pressure recovery flow into a core air flow via the pressure recovery return duct.

Yet another aspect of the disclosure resides in a gas turbine engine which includes a variable bleed valve apparatus. The aircraft gas turbine engine includes a fan, a booster, and a high pressure compressor circumscribed about an engine centerline and in downstream serial flow communication. A bypass duct is spaced radially outwardly from the booster. An annular fan frame supporting a fan casing surrounds the fan and the bypass duct. The annular fan frame includes an annular outer frame casing, a fan hub frame and a plurality of circumferentially spaced apart duct struts extending therebetween. A transition duct is located at a radially inner end of the fan hub frame and axially disposed between and in fluid communication with the booster and the high pressure compressor. A bleed exhaust duct extends from the fan hub frame to the bypass duct. At least one hybrid variable bleed valve apparatus is disposed radially outwardly from the transition duct and includes a static bleed slot, a variable bleed valve door, a radially inward bleed cavity and a pressure recovery return duct. The static bleed slot is disposed in a transition duct and extends generally axially downstream along an outer annular wall of the transition duct, the transition duct defining a flow path for a core air flow. The variable bleed valve door is disposed radially outwardly of the transition duct and the static bleed slot. The variable bleed valve door is pivotable or rotatable about an axis at or near a radially inward end of the variable bleed valve door. The radially inward bleed cavity is defined radially outwardly of the transition duct and radially inward of the variable bleed valve door for collection of a plurality of particulates. The pressure recovery return duct comprises an inlet in fluid communication with the cavity and an outlet in fluid communication with the transition duct. The pressure recovery return duct is located downstream of the static bleed slot. The hybrid variable bleed valve apparatus is operable to open and close the variable bleed valve door to a booster bleed flow, flowing radially outwardly from the static bleed slot, for extraction of the plurality of particulates and provide a pressure recovery flow into a core air flow via the pressure recovery return duct.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

Figure 5:
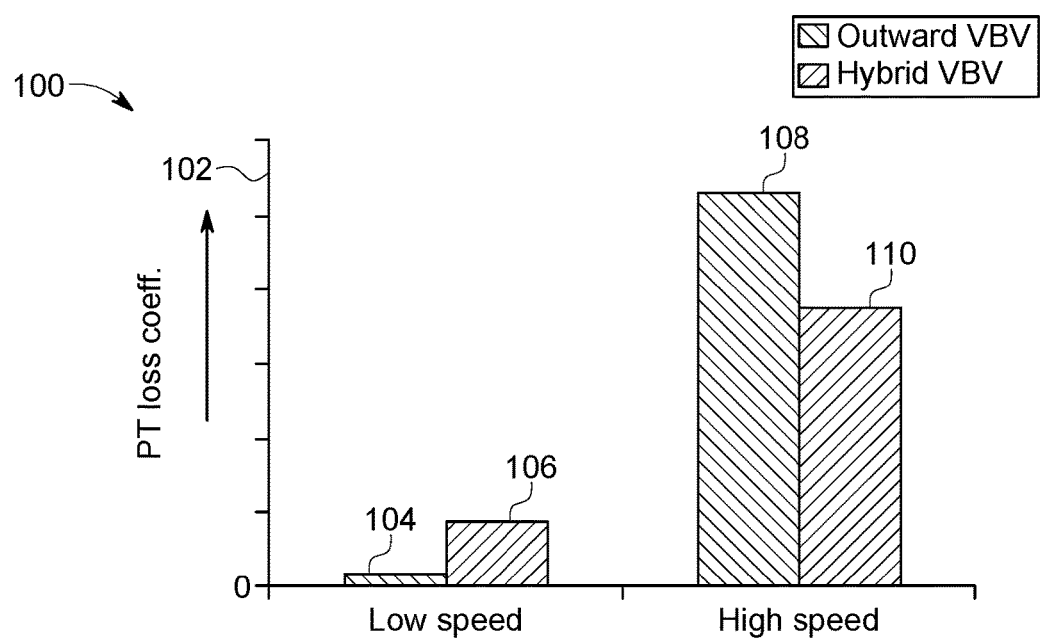
Figure 6:
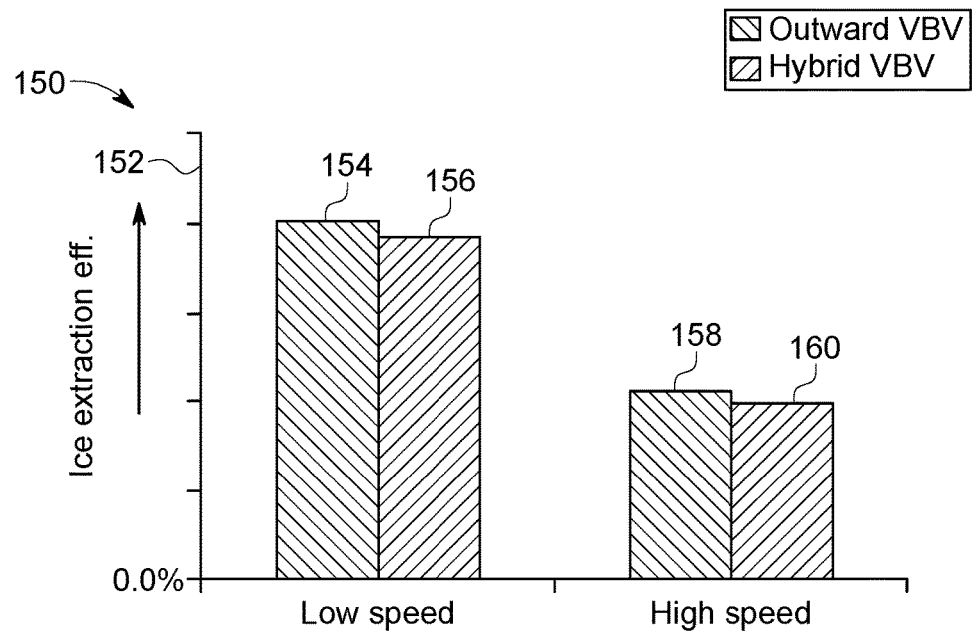

FIG. 5 is an exemplary graphical representation of the pressure loss for an outward variable bleed valve compared to a hybrid bleed valve at both high speed and low speed operation, in accordance with one or more embodiments shown or described herein; and FIG. 6 is an exemplary graphical representation of the particulate extraction for an outward variable bleed valve compared to a hybrid bleed valve at both high speed and low speed operation, in accordance with one or more embodiments shown or described herein.

DETAILED DESCRIPTION

Figure 1:
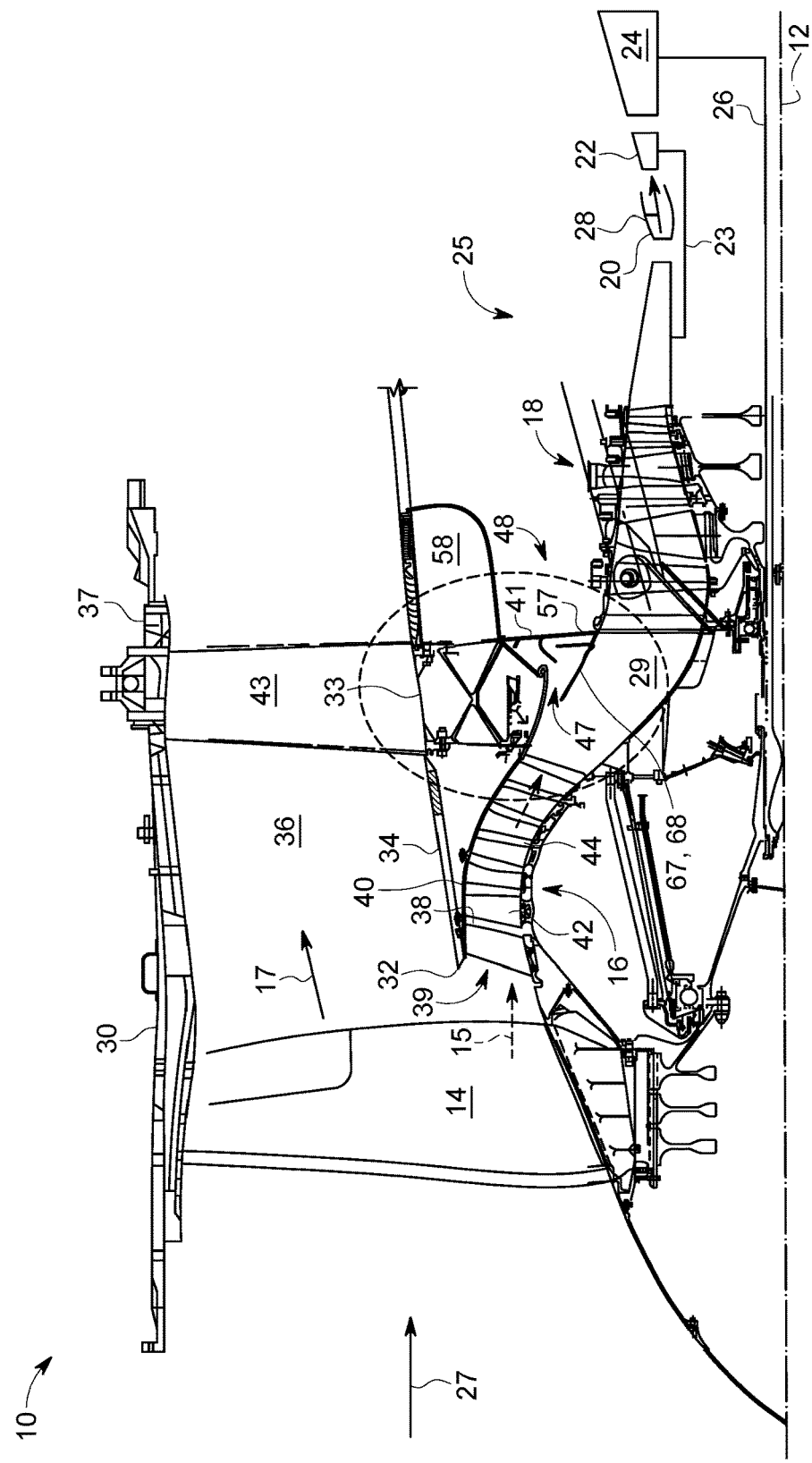
FIG. 1 is a longitudinal part sectional and part diagrammatical view illustration of an exemplary embodiment of an aircraft gas turbine engine with a hybrid bleed valve (VBV) disposed between a booster and a high pressure compressor, in accordance with one or more embodiments shown or described herein.

Illustrated in FIG. 1 is an exemplary aircraft turbofan gas turbine engine 10 circumscribed about an engine centerline 12 and suitably designed to be mounted to a wing or fuselage of an aircraft. The engine 10 includes, in downstream serial flow communication, a fan 14, a booster 16, a high pressure compressor 18, a combustor 20, a high pressure turbine (HPT) 22, and a low pressure turbine (LPT) 24. A core engine 25 includes the HPT or high pressure turbine 22 joined by a high pressure drive shaft 23 to the high pressure compressor 18 and the combustor 20. The LPT or low pressure turbine 24 is joined by a low pressure drive shaft 26 to both the fan 14 and the booster 16.

There are high bypass aircraft gas turbine engines such as some built by Rolls Royce that have more than two compressors and turbines. Rolls Royce, for example, has a three spool engine with three compressors each of which is driven by a different turbine. Thus, the hybrid VBV valve disclosed herein may be incorporated between two compressors and is not limited to being only between a low pressure compressor such as the booster illustrated herein and a high pressure compressor.

In typical operation, air 27 is pressurized by the fan 14 and produces an inner or core airflow 15 channeled through the booster 16 which further pressurizes the core airflow 15. The pressurized air is then flowed to the high pressure compressor 18 which further pressurizes the air. The pressurized air is mixed with fuel in the combustor 20 for generating hot combustion gases 28 that flow downstream, in turn, through the HPT 22 and the LPT 24.

A flow splitter 34 surrounding the booster 16 immediately behind the fan 14 includes a sharp leading edge 32 which splits the fan air 27 pressurized by the fan 14 into a radially inner stream (core airflow 15) channeled through the booster 16 and a radially outer stream or bypass airflow 17 is channeled through a bypass duct 36 spaced radially outwardly from the booster 16. A fan casing 30, surrounding the fan 14 and the bypass duct 36, is supported by an annular fan frame 33 circumscribed about the engine centerline 12. The booster 16 includes alternating annular rows 44 of booster blades 42 and vanes 38 extending radially outwardly and inwardly across a booster flowpath 39 in a booster duct 40. The annular row of booster blades 42 are suitably joined to the fan 14. The booster 16 is located forward of the fan frame 33 and radially inboard of the flow splitter 34.

The fan frame 33 includes an annular outer frame casing 37, a fan hub frame 41, and a plurality of circumferentially spaced apart duct struts 43 extending therebetween. The fan outlet guide vanes 43 are airfoil shaped since bypass air passes between the adjacent ones thereof. A transition duct 29, also referred to as a gooseneck, is located at a radially inner end 57 of the fan hub frame 41 and is axially disposed between and in fluid communication with the booster 16 and the high pressure compressor 18 of the core engine 25. Bleed exhaust ducts 58 lead away from the fan hub frame 41 to the bypass duct 36.

Figure 2:
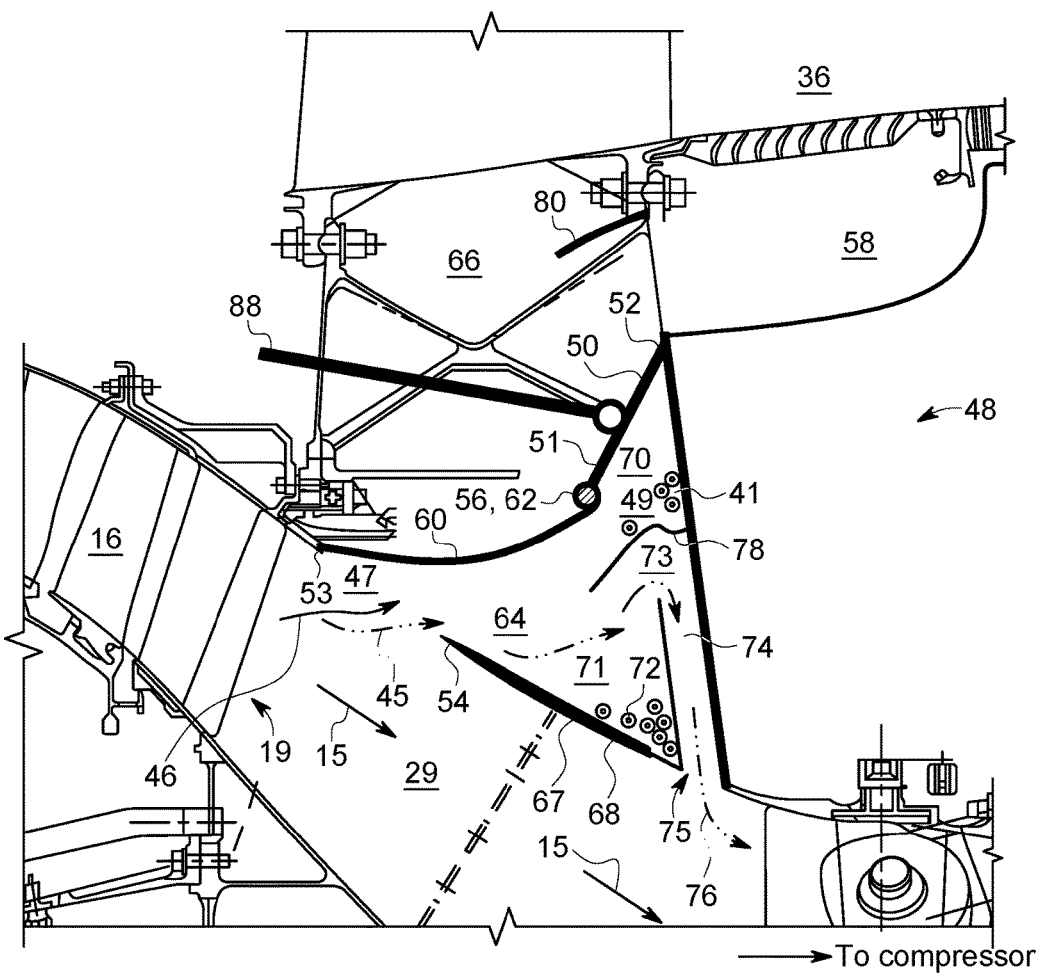
FIG. 2 is an enlarged part sectional and part diagrammatical view illustration of the hybrid variable bleed valve of the engine illustrated in FIG. 1 including a bleed valve door of the valve in a closed position, in accordance with one or more embodiments shown or described herein.
Figure 3:
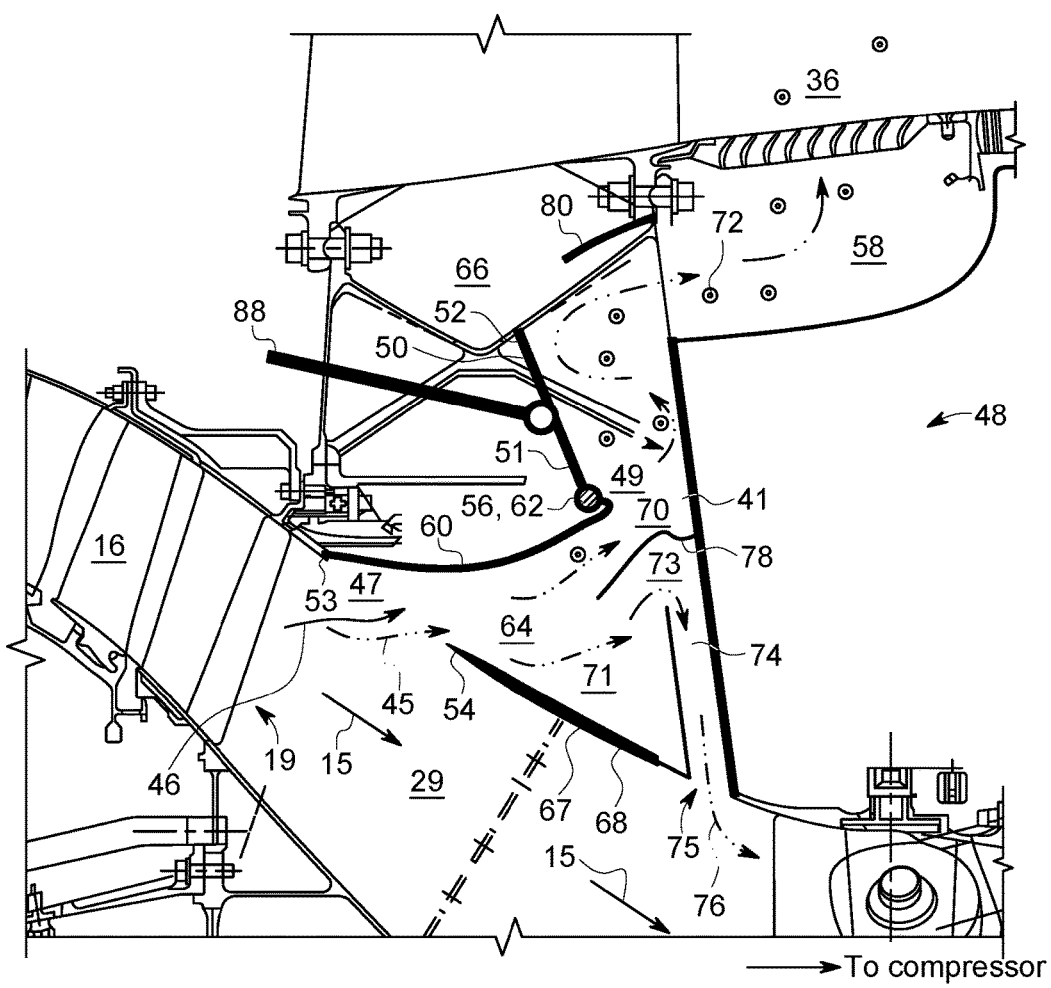
FIG. 3 is an enlarged part sectional and part diagrammatical view illustration of the hybrid variable bleed valve of the engine illustrated in FIG. 1 including a bleed valve door of the valve in an open position, in accordance with one or more embodiments shown or described herein.

Referring more particularly to FIGS. 2 and 3, illustrated are enlargements of a portion of the engine 10 of FIG. 1, as indicated generally by the dotted circle in FIG. 1. A hybrid variable bleed valve apparatus 48 is used to bleed the core airflow 15 between the booster 16 and the high pressure compressor 18 to prevent engine upset under certain engine operating conditions, including the buildup of unwanted particulates and to minimize pressure loss in the engine 10 and thus improved efficiency. As illustrated, the hybrid variable bleed valve apparatus 48 includes a hybrid variable bleed valve 49 (hybrid VBV) with a static bleed slot 47. The static bleed slot 47 is disposed in an outer annular wall 67 of a transition duct 29 between booster 16 and the high pressure compressor 18. The static bleed slot 47 defining an opening 55 in the outer annular wall 67 as an inlet for a booster bleed flow 45. In the exemplary embodiments of the transition duct 29, the outer annular wall 67 is an outer conical wall 68. In an alternate embodiment, the outer annular wall 67 is an outer curved wall.

The hybrid VBV 49 further includes a variable bleed valve (VBV) door 50 disposed radially outward from the static bleed slot 47. The VBV door 50 is illustrated in a closed position in FIG. 2 and in an open position in FIG. 3. As best illustrated in FIG. 3, the VBV door 50 is operable to allow a flow of bleed air, and more particularly the booster bleed flow 45 along a booster bleed flowpath 46 located radially outwardly of the transition duct 29 and extending from the static bleed slot 47, toward the VBV door 50 through the fan hub frame 41 through the bleed exhaust ducts 58 to the bypass duct 36. The static bleed slot 47 extends axially from an upstream, or forward, lip 53 of the outer conical wall 68 to a downstream, or aft, lip 54 of the outer conical wall 68, thereby defining an opening or inlet for the booster bleed flow 45.

Referring still to FIGS. 2 and 3, the VBV door 50 is radially extending and includes a radially inner end 51 and a radially extending outer end 52 located at opposed ends of the VBV door 50. The VBV door 50 is operable to bleed air and extract ice from the booster 16 and the transition duct 29 before it reaches the high pressure compressor 18 where it can cause stall conditions, airflow instability conditions, and quench the flame or combustion in the combustor 20. The circumferentially disposed plurality of bleed ducts 58 and the booster bleed flowpath 46 extend from the VBV door 50 in the fan hub frame 41 to the bypass duct 36.

The VBV door 50 is pivotable or rotatable about an axis which is exemplified by a hinge axis 56. The VBV door 50 is actuated by one or more actuators 88 that radially translate and rotate a radially unison ring (not shown) with respect to engine centerline 12. It is well known to operate or rotate VBV doors open and closed using actuators, unison rings, and bellcranks for positioning the VBV doors. One example of this may be found in U.S. Pat. No. 3,638,428 to Shipley, et al., Feb. 1, 1972, entitled "BYPASS VALVE MECHANISM".

The VBV door 50 is hinged to a bleed valve wall 60 near the radially inner end 51 of the VBV door 50. A door hinge 62 rotatably connects or hinges the VBV door 50 to the bleed valve wall 60. The VBV door 50 is operable to substantially seal the radially outer end 52 of the VBV door 50 against the fan hub frame 41 to prevent an outflow of the booster bleed flow 45 to the bleed flow exhaust duct 58 and operable to open for passage of the booster bleed flow 45 and extraction of the plurality of particulates from within variable bleed flow valve 49.

In a typical VBV configuration, a large VBV door is needed to extract large amounts of particulates, hence a large actuator mechanism is required. In the hybrid VBV disclosed here, particulate extraction is no longer dependent on the opening area of the VBV door 50. In the disclosed hybrid VBV, particulate extraction is a function of the static bleed slot 47 and the size of a radially inner cavity (described presently). More specifically, the VBV door 50 is sized to meet engine operability and can therefore be smaller than current known VBV door designs. As a result, the force on the hybrid VBV door 50 is aligned to the actuator arm axis thereby reducing a bending moment force and allowing the use of a smaller actuator.

The exemplary embodiment of the hybrid VBV 49 includes a radially inward bleed cavity 64 inside the variable bleed valve 49 leading to the bleed exhaust duct 58 via a radially outer cavity 66. Particulates 72 that are carried into the radially inward bleed cavity 64 would be trapped in two sub-cavities, and more particularly into an aft cavity 70 and a forward cavity 71. In an embodiment, the aft cavity 70 provides for normal engine operability bleed control, hence proximate the actuated VBV door 50, and the forward cavity 71 further provides for the recovery of a portion of the booster bleed flow 45 back into compressor 18 via a pressure recovery duct 74. As previously indicated, the VBV door 50 in the aft cavity 70 operates like a conventional VBV, e.g., fully open during ground idle and fully closed during cruise. During low-speed operation when the VBV door 50 is open, as best illustrated in FIG. 3, particulates 72 flow into the bypass fan duct 36 via the bypass bleed duct 58. During high-speed operation, when the VBV door is closed, as best illustrated in FIG. 2, particulates 72 would be carried into a stagnating low-velocity environment, and more particularly into the forward and aft cavities 70 and 71, where the kinetic energies of the particulates 72 would be depleted sufficiently to settle onto the walls defining the cavities 70, 71. In an embodiment, the walls in the cavities 70, 71 are contoured to minimize the particulates 72 from bouncing back into the main core compressor flow 15. The forward cavity 71 as described further includes a stagnating flow to trap the particulates 72 within the forward cavity 71, and the pressure recovery duct 74, includes a reverse flow, for the return of a clean air as a pressure recovery flow 76 to the compressor 18, via an outlet 75 in fluid communication with the transition duct 29.

One or more guide vane components may be included to further enhance the booster bleed flow 45 and extraction of the particulates 72. More specifically, a pressure recovery vane 78 is configured to aid in channeling a portion of the booster bleed flow 45 toward an inlet 73 of the pressure recovery duct 74 as the pressure recovery flow 76. As best illustrated in FIGS. 2 and 3, the inlet 73 of the pressure recovery duct 74 is in fluid communication with the radially inward bleed cavity 64. A flow guide vane 80 is configured in cavity 66 to aid in channeling the booster bleed flow 45 into the bypass duct 36 when the VBV door 50 is open. When the hybrid VBV 49 and the VBV door 50 are opened or in an open position as best illustrated in FIG. 3, the static bleed slot 47 allows the booster bleed flow 45 from the core airflow 15 to flow into bypass duct 36 via the bleed flow duct 58.

In an embodiment, the hybrid VBV 49 is designed to be operated with the VBV door 50 in a closed position as illustrated in FIG. 2 and in a partial or full open position as illustrated in FIG. 3. The VBV door 50 may be rotated to any position between the fully closed position and the full open position as illustrated in FIGS. 2 and 3. The VBV door 50 in the fully closed position when the radially outer end 52 of the VBV door 50 seals against the fan hub frame 41 and seals the booster bleed flow 45 within the radially inward bleed cavity 64 and the sub-cavities 70, 71.

The exemplary embodiment of the hybrid VBV 49 is operated with the VBV door 50 fully closed or in the closed position as illustrated in FIG. 2 for high power operation with the VBV door 50 cooperating with and substantially sealing the radially outer end 52 of the VBV door 50 against the fan hub frame 41 to seal the bleed exhaust duct 58. The static bleed slot 47 provides for a continuous booster bleed flow 45 into the radially inward cavity 64 and thus removal of the particulates 72, such as ice, ice crystals, water droplets, sand and dust removed from the transition duct 29 to the subcavities 70, 71.

The exemplary embodiment of the hybrid VBV 49 is operated with the VBV door 50 in the closed position as illustrated in FIG. 2 for high power operation with the VBV door 50 cooperating with and substantially sealing the radially outer end 52 of the VBV door 50 against the fan hub frame 41 to seal the bleed fan duct 58. With the VBV door 50 in the closed position, the booster bleed flow 45 is removed from the core airflow 15 and the particulates 72, such as ice, ice crystals, water droplets, sand and dust are removed from the transition duct 29 to the subcavities 70, 71. The VBV door 50 may be rotated to the open, or partially open position, as illustrated in FIG. 3 with the VBV door 50 providing for the booster bleed flow path 47 to the outer radial cavity 66 and the bleed flow duct 58. This open position is designed primarily for low and part power engine operations with ice, ice crystal, water droplet, sand, and dust extraction from the transition duct 29. The VBV door 50 can also be rotated between the open position and a partially open position to modulate the booster bleed flow 45 from the core airflow 15 for booster operating line control.

Figure 4:
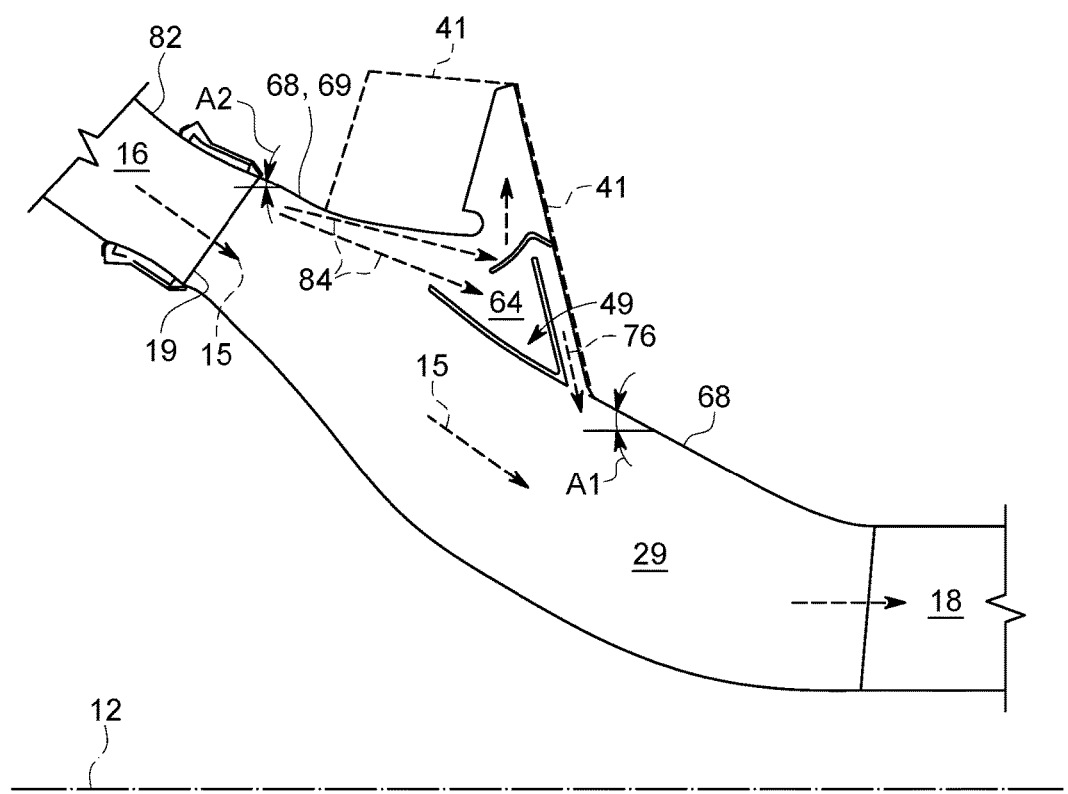
FIG. 4 is a sectional view illustration of the structural constraints and flow path of another embodiment of a hybrid variable bleed valve, in accordance with one or more embodiments shown or described herein.

Referring to FIG. 4, illustrated is the hybrid VBV 49 as it relates to the existing fan hub frame 41, as illustrated by dotted line. As illustrated, the hybrid VBV 49 remains within the current boundaries of known fan hub frames. In addition, in an embodiment, ice and other particulate 72 removal may be enhanced by further turning the core airflow 15 radially outwardly away the engine centerline 12 and the high pressure compressor 18 in the transition duct 29 after it exists a booster outlet 19 leading to the transition duct 29. This flow turning is accomplished by the outer conical wall 68, or curved wall, of the transition duct 29 having a transition duct conical angle Al, with respect to the engine centerline 12, greater than a booster conical angle A2 of a booster outer shroud 82. The booster outer shroud 82 surrounds outer ends of booster outlet guide vanes 38 (OGV) at the booster outlet 19.

Core airflow 15 exiting the booster outlet 19 flows linearly on a path 84 that is tangent to an outer flowpath of the booster outlet 19 which is generally the same as the booster outer shroud 82. In an ice shed, the ice particulates follow this same path or trajectory with most of the ice being located in the outer portion of the flowpath. Ice crystal, water droplet, sand and dust trajectories follow the above described similar behavior. Having the transition duct conical angle Al greater than the booster conical angle A2 is more conducive for extracting particulates at high and low power operations, while minimizing the amount of airflow bleed from the booster discharge and thereby minimizing the exhaust gas temperature (EGT) and other cycle effects.

The core airflow 15 in the booster 16 and transition duct 29 stays attached to the wall, and turns down into the compressor 18 because of its difference in angles. However, the particulates 72, such as ice, ice crystals, water droplets, sand and dust having higher mass and inertia continue on their trajectories out of booster 16 toward the static bleed slot 47. They exit the booster 16 and collide with an upstream portion 69 of the outer wall 68 of the transition duct 29 and bounce or slide along it until the flowpath 84 turns directing them to flow into the radially inward bleed cavity 64. When the VBV door 50 is open, the particulates 72 in the flowpath 84 flow into the bleed exhaust duct 58 (FIG. 3). The configuration of the transition duct 29 relative to the static bleed slot 47 will result in the particulates being centrifuged outward and more readily extracted. In addition, the vane 38 and blade 42 designs within the booster 16 may be changed to introduce more outward push to the particulates 72 by an increased dihedral blade shape.

Turning now to FIGS. 5 and 6, illustrated are exemplary graphical representations of the pressure loss coefficient for an outward variable bleed valve compared to a hybrid bleed valve (FIG. 5), as disclosed herein, and particulate extraction efficiency for an outward variable bleed valve compared to a hybrid bleed valve (FIG. 6), as disclosed herein, illustrated at both high speed and low speed operation. Referring more particularly to FIG. 5, illustrated in an exemplary simulated graphical representation, generally referenced 100, is the pressure benefit of hybrid variable bleed valve apparatus 48 as disclosed herein, and more particularly when compared to a known outward configured variable bleed valve, at both high speed and low speed operation, in accordance with an exemplary embodiment. More specifically, graph 100 illustrates the pressure loss coefficient (plotted in axis 102) of a known outward configured VBV operating at low speed 104, a hybrid VBV as disclosed herein operating at low speed 106, a known outward configured VBV operating at high speed 108 with a hybrid VBV as disclosed herein operating at high speed 110.

As illustrated, when operating at low speed, the pressure loss coefficient of the known outward configured VBV 104 is near equal to that of the pressure loss coefficient of the hybrid VBV 106 disclosed herein. At a high operating speed, the pressure loss coefficient of the known outward configured VBV 108 is significantly greater than that of the pressure loss coefficient of the hybrid VBV 106 disclosed herein. It was found that significant pressure loss benefit was obtained in the hybrid VBV disclosed herein, over known outward configured VBVs.

Referring more particularly to FIG. 6, illustrated in an exemplary simulated graphical representation, generally referenced 150, is the particulate extraction efficiency, and in particular the ice extraction efficiency, of the hybrid variable bleed valve apparatus 48 as disclosed herein, and more particularly when compared to a known variable bleed valve, at both high speed and low power operation, in accordance with an exemplary embodiment. More specifically, graph 150 illustrates the ice extraction efficiency (plotted in axis 152) of a known outward configured VBV operating at low speed 154 as compared to a hybrid VBV as disclosed herein operating at low speed 156, and a known outward configured VBV operating at high speed 158 as compared to a hybrid VBV as disclosed herein operating at high speed 160.

As illustrated, when operating at low power, the ice extraction efficiency of the known outward configured VBV 154 is near equal to that of the ice extraction efficiency of the hybrid VBV 156 disclosed herein. At a high power, the ice extraction efficiency of the known outward configured VBV 158 is near equal to that of the ice extraction efficiency of the hybrid VBV 160 disclosed herein.

Accordingly, as disclosed herein and as illustrated in FIGS. 1-5, provided are various technological advantages and/or improvements over existing variable bleed valves that provide for continuous particulate extraction at all engine powers, i.e. high altitude operation, without the negative loss in efficiency due to pressure loss during VBV door opening and closing and large door actuator weights. The proposed hybrid variable bleed valve as disclosed herein, have the potential to provide optimum compressor performance and efficiency and exhaust gas temperature maintenance. The hybrid variable bleed valve includes a static bleed slot and interior configured cavities for containment of particulates therein, may be optimized and adjusted individually for the application on which they are deployed.

Exemplary embodiments of a hybrid bleed valve capable of continuous operation are described in detail above. Although the hybrid bleed valve has been described with reference to an axial compressor disposed downstream of a booster, the hybrid bleed valve as described above can be used in any axial flow system, including other types of engine apparatuses that include a compressor, and particularly those in which continuous particulate extraction at all engine speeds and a reduction in pressure loss efficiency penalty is desired. Other applications will be apparent to those of skill in the art. Accordingly, the hybrid bleed valve as disclosed herein is not limited to use with the specified engine apparatus described herein. Moreover, the present disclosure is not limited to the embodiments of the axial compressor described in detail above. Rather, other variations of the axial, mixed and radial compressors including hybrid bleed valve embodiments may be utilized within the spirit and scope of the claims.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

While there has been shown and described what are at present considered the preferred embodiments of the disclosure, it will be obvious to those skilled in the art that various changes and modifications can be made therein without departing from the scope of the disclosure defined by the appended claims.

The invention claimed is:

1. A hybrid variable bleed valve apparatus comprising:
a static bleed slot disposed in a transition duct, the static bleed slot extending generally axially downstream along an outer annular wall of the transition duct, the transition duct defining a flow path for a core air flow;
a variable bleed valve door disposed radially outward from the transition duct and the static bleed slot, the variable bleed valve door operable about an axis at or near a radially inward end of the variable bleed valve door;
a radially inward bleed cavity defined outward from the transition duct and radially inward of the variable bleed valve door for collection of a plurality of particulates; and
a pressure recovery return duct comprising an inlet in fluid communication with the radially inward bleed cavity and an outlet in fluid communication with the transition duct, the pressure recovery return duct located downstream of the static bleed slot,
the hybrid variable bleed valve apparatus operable to
open the variable bleed valve door to a booster bleed flow, flowing radially outwardly via the static bleed slot, for extraction of the plurality of particulates in the radially inward bleed cavity and
close the variable bleed valve door to the booster bleed flow, flowing radially outwardly via the static bleed slot to provide a pressure recovery flow into the core air flow via the pressure recovery return duct.

2. The hybrid variable bleed valve apparatus as claimed in claim 1, wherein the static bleed slot extends axially from an upstream lip of the outer annular wall of the transition duct to a downstream lip of the outer annular wall of the transition duct and defines an opening in the outer annular wall as an inlet for the booster bleed flow.

3. The hybrid variable bleed valve apparatus as claimed in claim 1, wherein the outer annular wall of the transition duct is one of a conical outer wall or a curved annular wall.

4. The hybrid variable bleed valve apparatus as claimed in claim 1, further comprising one or more sub-cavities defined within the radially inward bleed cavity for particulate collection.

5. The hybrid variable bleed valve apparatus as claimed in claim 4, wherein the one or more sub-cavities comprise a forward cavity and an aft cavity.

6. The hybrid variable bleed valve apparatus as claimed in claim 1, wherein the variable bleed valve door is operable to substantially seal a radially outer end of the variable bleed valve door against a fan hub frame to prevent an outflow of the booster bleed flow and the plurality of particulates from within the radially inward bleed cavity and operable to open for passage of the booster bleed flow and extraction of the plurality of particulates from within the radially inward bleed cavity.

7. The hybrid variable bleed valve apparatus as claimed in claim 1, wherein the plurality of particulates include at least one of ice, ice crystals, water droplets, sand and dust.

8. The hybrid variable bleed valve apparatus as claimed in claim 1, wherein the transition duct includes a transition duct conical angle with respect to an engine centerline, a booster outer shroud upstream and adjacent the transition duct, the booster outer shroud having a booster conical angle with respect to an engine centerline, and the transition duct conical angle being greater than the booster conical angle.

9. The hybrid variable bleed valve apparatus as claimed in claim 1, wherein a booster bleed flowpath extends from the static bleed slot, through the radially inward bleed cavity, to the variable bleed valve door.

10. The hybrid variable bleed valve apparatus as claimed in claim 9, wherein the booster bleed flowpath further extends downstream or aft from the variable bleed valve door to a radial outer cavity, a bleed exhaust duct and a bypass duct.

11. The hybrid variable bleed valve apparatus as claimed in claim 1, further comprising an actuator operably linked to the variable bleed valve door.

12. A gas turbine hybrid variable bleed valve apparatus comprising:
   a transition duct including an annular outer wall defining a flow path for a core air flow;
   a static bleed slot disposed in the transition duct, the static bleed slot extending axially from an upstream lip of the outer annular wall of the transition duct to a downstream lip of the outer annular wall of the transition duct and defining an opening in the outer annular wall as an inlet for a booster bleed flow;
   a variable bleed valve door disposed outward from the transition duct and the static bleed slot, the variable bleed valve door pivotable or rotatable about an axis at or near a radially inward end of the variable bleed valve door,
   a radially inward bleed cavity defined outward from the transition duct and radially inward of the variable bleed valve door for collection of a plurality of particulates, the radially inward bleed cavity defining therein a forward sub-cavity and an aft sub-cavity;
   a pressure recovery return duct comprising an inlet in fluid communication with the cavity and an outlet in fluid communication with the transition duct and located downstream of the static bleed slot; and
   a booster bleed flowpath extending from the static bleed slot, through the radially inward bleed cavity, to the variable bleed valve door and downstream or aft from the variable bleed valve door to a radial outer cavity, a bleed exhaust duct and a bypass,
   the hybrid variable bleed valve apparatus operable to
     open the variable bleed valve door to a booster bleed flow, flowing radially outwardly via the static bleed slot, for extraction of the plurality of particulates in the radially inward bleed cavity and
     close the variable bleed valve door to the booster bleed flow, flowing radially outwardly via the static bleed slot to provide a pressure recovery flow into a core air flow via the pressure recovery return duct.

13. The hybrid variable bleed valve apparatus as claimed in claim 12, wherein the outer annular wall of the transition duct is one of a conical outer wall or a curved annular wall.

14. The hybrid variable bleed valve apparatus as claimed in claim 12, wherein the variable bleed valve door is operable to substantially seal a radially outer end of the variable bleed valve door against a fan hub frame to prevent an outflow of the booster bleed flow and the plurality of particulates from within the radially inward bleed cavity and operable to open for passage of the booster bleed flow and extraction of the plurality of particulates from within the radially inward bleed cavity.

15. The hybrid variable bleed valve apparatus as claimed in claim 12, wherein the plurality of particulates include at least one of ice, ice crystals, water droplets, sand and dust.

16. The hybrid variable bleed valve apparatus as claimed in claim 12, wherein the transition duct includes a transition duct conical angle with respect to an engine centerline, a booster outer shroud upstream and adjacent the transition duct, the booster outer shroud having a booster conical angle with respect to an engine centerline, and the transition duct conical angle being greater than the booster conical angle.

17. The hybrid variable bleed valve apparatus as claimed in claim 12, further comprising an actuator operably linked to the variable bleed valve door.

18. An aircraft gas turbine engine comprising:
   a fan, a booster, and a high pressure compressor circumscribed about an engine centerline and in downstream serial flow communication;
   a bypass duct spaced radially outwardly from the booster;
   an annular fan frame surrounding the fan and the bypass duct, the annular fan frame including an annular outer frame casing, a fan hub frame and a plurality of circumferentially spaced apart duct struts extending therebetween;
   a transition duct located at a radially inner end of the fan hub frame and axially disposed between and in fluid communication with the booster and the high pressure compressor;
   bleed exhaust ducts extending from the fan hub frame to the bypass duct;
   at least one hybrid variable bleed valve apparatus disposed radially outwardly from the transition duct, the at least one hybrid variable bleed valve apparatus comprising:
     a static bleed slot disposed in a transition duct, the static bleed slot extending generally axially downstream along an outer annular wall of the transition duct, the transition duct defining a flow path for a core air flow;
     a variable bleed valve door disposed outward from the transition duct and the static bleed slot, the variable bleed valve door pivotable or rotatable about an axis at or near a radially inward end of the variable bleed valve door,
     a radially inward bleed cavity defined outward from the transition duct and radially inward of the variable bleed valve door for collection of a plurality of particulates; and
     a pressure recovery return duct comprising an inlet in fluid communication with the radially inward bleed cavity and an outlet in fluid communication with the transition duct, the pressure recovery return duct located downstream of the static bleed slot,
     the hybrid variable bleed valve apparatus operable to
       open the variable bleed valve door to a booster bleed flow, flowing radially outwardly via the static bleed slot, for extraction of the plurality of particulates in the radially inward bleed cavity and
       close the variable bleed valve door to the booster bleed flow, flowing radially outwardly via the static bleed slot to provide a pressure recovery flow into a core air flow via the pressure recovery return duct.

19. The aircraft gas turbine engine as claimed in claim 18, wherein the static bleed slot extends axially from an upstream lip of the outer annular wall of the transition duct to a downstream lip of the outer annular wall of the transition duct and defines an opening in the outer annular wall as an inlet for the booster bleed flow.

20. The aircraft gas turbine engine as claimed in claim 18, wherein the variable bleed valve door is operable to substantially seal a radially outer end of the variable bleed valve door against the fan hub frame to prevent an outflow of the booster bleed flow and the plurality of particulates from within the radially inward bleed cavity and operable to open for passage of the booster bleed flow and extraction of the plurality of particulates from within the radially inward bleed cavity.

* * * * *